United States Patent
Embach et al.

(10) Patent No.: US 7,895,917 B2
(45) Date of Patent: Mar. 1, 2011

(54) CONFORMAL GRASP HANDLE

(75) Inventors: James T. Embach, Rochester Hills, MI (US); John C. Ulicny, Oxford, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 1063 days.

(21) Appl. No.: 10/861,190

(22) Filed: Jun. 4, 2004

(65) Prior Publication Data

US 2005/0268744 A1   Dec. 8, 2005

(51) Int. Cl.
B62D 1/04 (2006.01)

(52) U.S. Cl. ...................................................... 74/552

(58) Field of Classification Search .................. 74/552, 74/553; 280/771; 16/432
See application file for complete search history.

(56) References Cited

U.S. PATENT DOCUMENTS

| 4,050,265 | A | * | 9/1977 | Drennen et al. ............... 464/96 |
| 4,615,856 | A | | 10/1986 | Silverman |
| 4,640,150 | A | * | 2/1987 | Kobayashi et al. ............. 74/552 |
| 5,506,300 | A | * | 4/1996 | Ward et al. ..................... 525/88 |
| 6,158,910 | A | | 12/2000 | Jolly et al. |
| 6,512,202 | B2 | | 1/2003 | Haag et al. |
| 6,968,599 | B2 | * | 11/2005 | Blauer et al. .................. 16/431 |
| 2002/0124683 | A1 | * | 9/2002 | Kreuzer et al. ................. 74/552 |
| 2005/0155449 | A1 | * | 7/2005 | Birchmeier et al. ........... 74/552 |
| 2006/0100697 | A1 | * | 5/2006 | Casanova ................... 623/2.11 |

FOREIGN PATENT DOCUMENTS

| JP | 61283536 | * | 12/1986 |
| JP | 02101288 | A | * | 4/1990 |
| JP | 07285084 | A | * | 10/1995 |

* cited by examiner

Primary Examiner—Vicky A Johnson (57) ABSTRACT

A conformal grasp handle that molds itself to an applied load of an object, e.g., an end user's hands as they grip the conformal grasp handles. The conformal grasp handle retains the shape of the local deformation caused by the applied load until the handle is intentionally reshaped or the applied force of the object onto the handle is removed. As such, the grasp handles can advantageously be used to adapt to the individual user's anthropometric measurements, posture, hand position, and the like, among others. Suitable automotive applications include, but are not intended to be limited to, steering wheels, shift knobs, and the like.

4 Claims, 5 Drawing Sheets

CONFORMAL GRASP HANDLE

BACKGROUND

The present disclosure relates to conformal grasp handles, and more particularly, to conformal grasp handles for use in automotive vehicles.

Comfort and personalization is continually being addressed by automotive manufacturers. Attempts to provide comfort and personalization to grasp handles within the vehicle have generally been limited to the use of heating elements, contoured surfaces, padding, and decorative surfaces. With regard to the contoured surfaces of grasp handles, the designs have generally been focused on a standard occupant model since the design itself is fixed and does not change between periods of use and non-use. Moreover, the design is limited to the comfort and personalization provided by the standard occupant model and does not compensate for variations in the actual end user, e.g., short versus tall, long armed versus short armed, gloved versus non-gloved, and the like.

Accordingly, there remains a need in the art for conformal grasp handles that can mold themselves to the particular occupant or end user.

BRIEF SUMMARY

Disclosed herein are conformal grasp handles and process for operating the conformal grasp handles. In one embodiment, a conformal grasp handle, comprises a flexible covering; a rigid core member; a shape memory material intermediate the core member and the flexible covering, wherein the shape memory material comprises a magnetorheological fluid, an electrorheological fluid, a shape memory polymer, a shape memory alloy, a magnetic shape memory alloy, an electroactive polymer, and combinations comprising at least one of the foregoing shape memory materials; and an activation device in operative communication with the shape memory material to change a shape of the conformal grasp handle.

In another embodiment, the conformal grasp handle comprises a flexible covering; a rigid core member formed of an electromagnet, wherein the electromagnet comprises a plurality of apertures; a plurality of pins formed of a magnetic material, each one of the plurality of pins having one end fixedly attached to the flexible covering and an other end slidably engaged with each one of the plurality of apertures; and an activation device in operative communication with the electromagnetic core member to selectively prevent sliding engagement of the pins within the apertures.

In yet another embodiment, the conformal grasp handle comprises a flexible covering; a core member, wherein the flexible covering and the core member define a fluidly sealed area; a plurality of beads disposed in the fluidly sealed area; and a vacuum in fluid communication with the sealed area.

A process for operating a conformal grasp handle comprises applying a load to a surface of the conformal grasp handle to create a local deformation pattern, wherein the conformal grasp handle comprises a flexible covering, a core member, a shape memory material intermediate the core member and the flexible covering, wherein the shape memory material comprises a magnetorheological fluid, an electrorheological fluid, a shape memory polymer, a shape memory alloy, a magnetic shape memory alloy, an electroactive polymer, and combinations comprising at least one of the foregoing shape memory materials, and an activation device in operative communication with the shape memory material to change a shape of the conformal grasp handle; retaining the local deformation pattern; and selectively activating the shape memory material with the activation device to restore an original shape of the conformal grasp handle, whereby the local deformation is substantially removed.

In another embodiment, the process for operating the conformal grasp handle comprises applying a load to a surface of the grasp handle to create a local deformation pattern, wherein the conformal grasp handle a flexible covering, a rigid core member, wherein the flexible covering and the rigid core member define a fluidly sealed area, a plurality of beads disposed in the fluidly sealed area, and a vacuum in fluid communication with the sealed area; and applying a vacuum to the fluidly sealed area to retain the local deformation pattern.

The above described and other features are exemplified by the following figures and detailed description.

BRIEF DESCRIPTION OF THE DRAWINGS

Referring now to the figures, which are exemplary embodiments and wherein the like elements are numbered alike.

DETAILED DESCRIPTION

The following description of the preferred embodiments is merely exemplary in nature and is in no way intended to limit the disclosure, its application, or uses.

Disclosed herein are conformal grasp handles for various automotive applications. The conformal grasp handles mold themselves to an applied object, e.g., an end user's hands as they grip the conformal grasp handles, and retain that shape until the handle is intentionally reshaped or the applied force of the object onto the handle is removed. As such, the conformal grasp handles can advantageously be used to adapt to the individual's anthropometric measurements, posture, hand position, and the like. Suitable automotive applications include, but are not intended to be limited to, steering wheels, shift knobs, and the like.

In one embodiment, the conformal grasp handles are formed from shape memory materials. Shape memory materials generally refer to materials or compositions that have the ability to remember their original shape, which can subsequently be recalled by applying an external stimulus. As such, deformation from the original shape is a temporary condition. Exemplary shape memory materials include shape memory alloys, shape memory polymers, and the like. Suitable shape memory materials include, without limitation, shape memory alloys (SMA), magnetic shape memory alloys, shape memory polymers (SMP), electroactive polymers (EAP), magnetorheological fluids and elastomers (MR), and electrorheological fluids (ER). In addition to the above noted shape memory materials, a bead filled conformable grasp handle can be employed in other embodiments, wherein the grasp handle includes a vacuum assist mechanism to fix the end-users hand impression as will be described in greater detail below.

Figure 1:
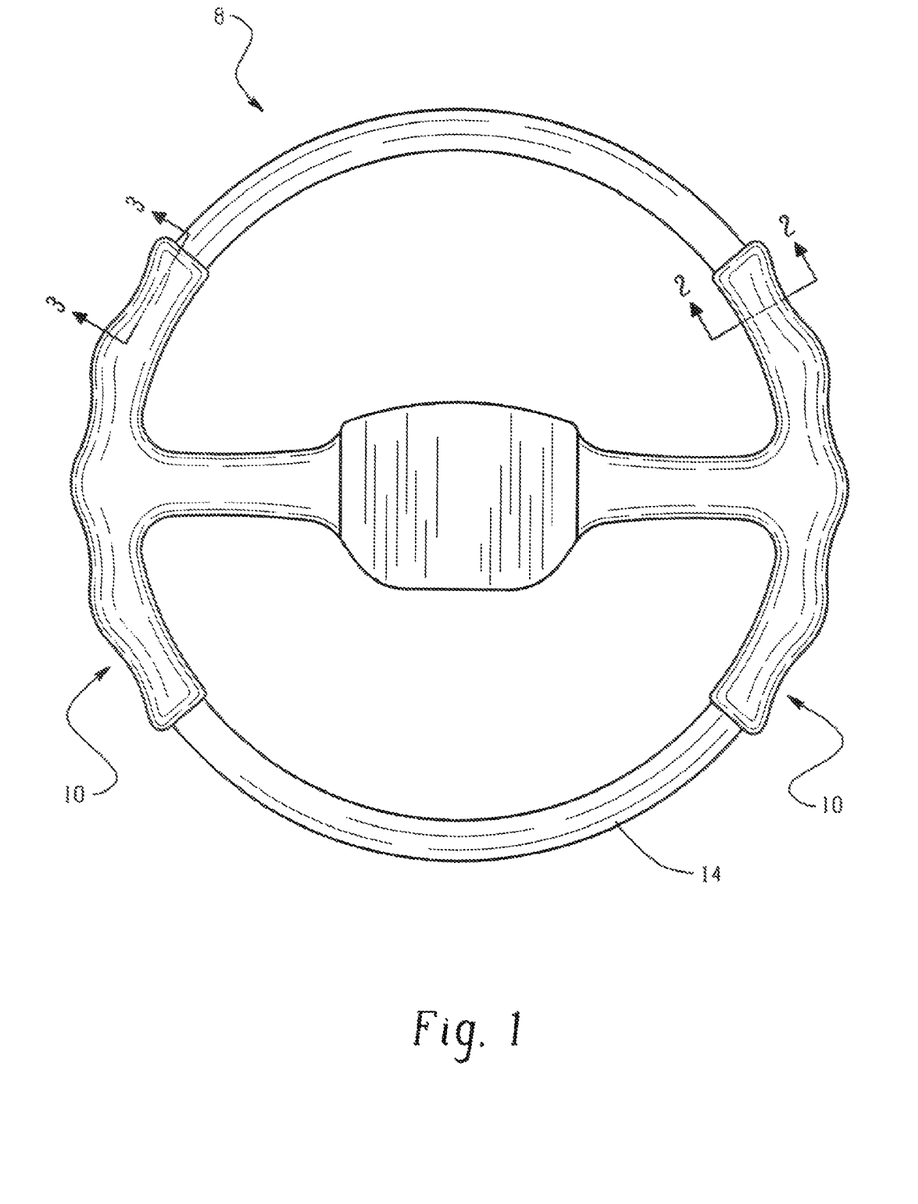
FIG. 1 illustrates a perspective view of a steering wheel including a conformal grasp handle.

Referring now to FIG. 1, there is illustrated an exemplary steering wheel 8, which can include the conformal grasp handles generally designated by reference numeral 10. Although the Figures illustrate the grasp handles in the so-called 10 and 2 o'clock positions, it should be understood that the grasp handles could be placed anywhere on the steering wheel in one or more positions about the steering wheel. Moreover, is contemplated that the entire surface of the steering wheel could comprise the conformal grasp handle.

Figure 2:
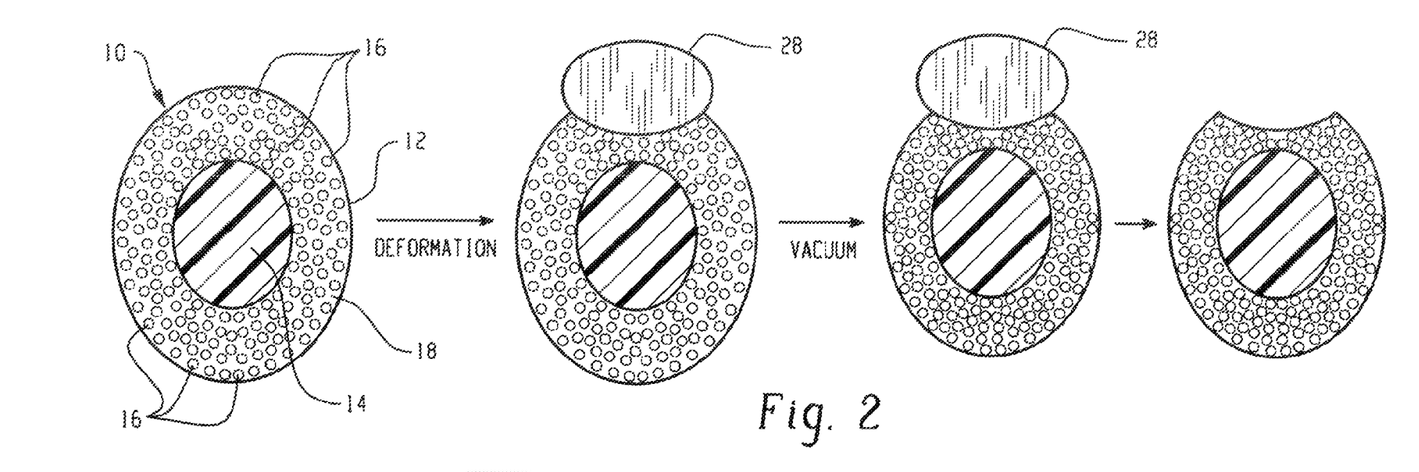
FIG. 2 is a cross sectional view of the conformal grasp handle taken along lines 2-2 of FIG. 1.

FIGS. 2 illustrates a cross sectional view of the conformal grasp handle in accordance with one embodiment. As shown, the conformal grasp handle 10 comprises a flexible outer covering 12 and a rigid annular ring 14 that provides rigidity and form to the steering wheel. The flexible outer covering 12 is made of a soft synthetic resin, cloth, and/or leather. Intermediate the flexible outer covering 12 and the rigid annular ring 14 are a plurality of beads 16.

Figure 3:
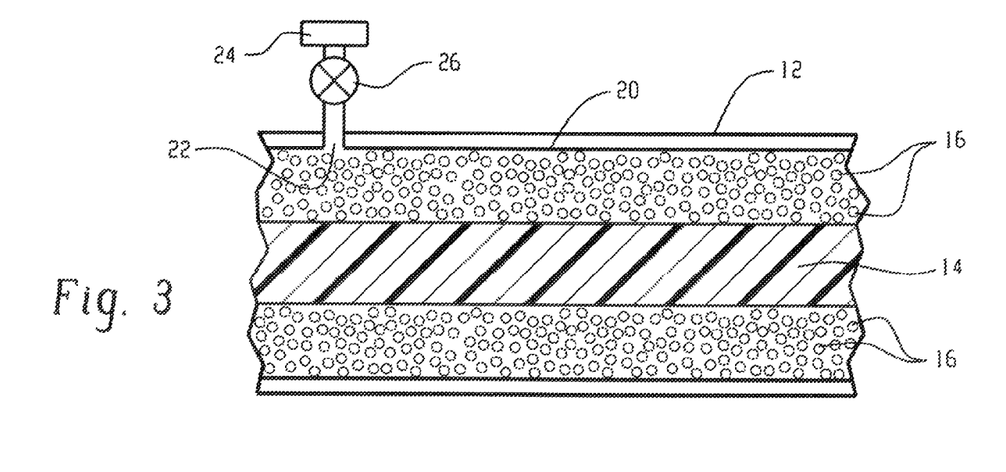
FIG. 3 is a cross sectional view of the conformal grasp handle taken along lines 3-3 of FIG. 1.

In one embodiment, the flexible outer covering 12 and the rigid annular ring 14 define a fluidly sealed area 18 in which the plurality of beads 16 is disposed. An opening in the flexible covering 12 is in fluid communication with a vacuum and the fluidly sealed area. Optionally, a sealed inner lining 20 (shown in FIG. 3) is provided intermediate the plurality of beads 16 and the outer covering 12. An opening is disposed in the outer covering 12 and the sealed inner lining 20, if present, and is in fluid communication with a vacuum 24 and the sealed area 18 defined by the lining. Alternatively, an opening may be disposed in the annular ring member 14 along with a conduit in fluid communication with the vacuum. The opening may be configured with a valve 26 selective to release and maintain the vacuum, once applied, from the sealed area.

The plurality of beads 16 can be of any suitable material such as, for example, polyethylene and/or polystyrene beads. Moreover, although reference has been made specifically to beads, other types of materials can be used in place of the beads, e.g., particles, compliant foam, and the like. Accordingly, any reference made herein to beads is intended to include other types of materials that function in the manner intended for the conformal grasp handle. The diameter of the beads may be uniform or have a distribution. The amounts of and size of the beads are in amounts effective to permit local deformation upon an applied force of an object, e.g., a driver's hand, and remain after a fluid is removed from the sealed area. In one embodiment, the local deformation caused by the initial applied force of an object is about the same as the deformation remaining after removal of the object.

In operation, as shown in FIG. 2, an object 28 contacts the steering wheel 8 to cause a local deformation pattern in the grasp handle, which causes displacement of the beads 16 from the immediate area surrounding the local deformation. Fluid is then withdrawn from the sealed area 18 via the vacuum 24 as previously described, which causes the flexible covering 12 to shrink and reduce the volume defined by the sealed area 18. As a result, compaction of the beads 16 occurs within the sealed area, which effectively retains the deformation pattern caused by the initial local deformation. Because of this, removal of the object 28 does not result in the removal of the local deformation. The compliant structure is returned to its original shape by releasing the vacuum. In this as well as the other embodiments to be described herein, a switch can be employed in combination with a sensor to activate the conformal grasp handle.

Figure 4:
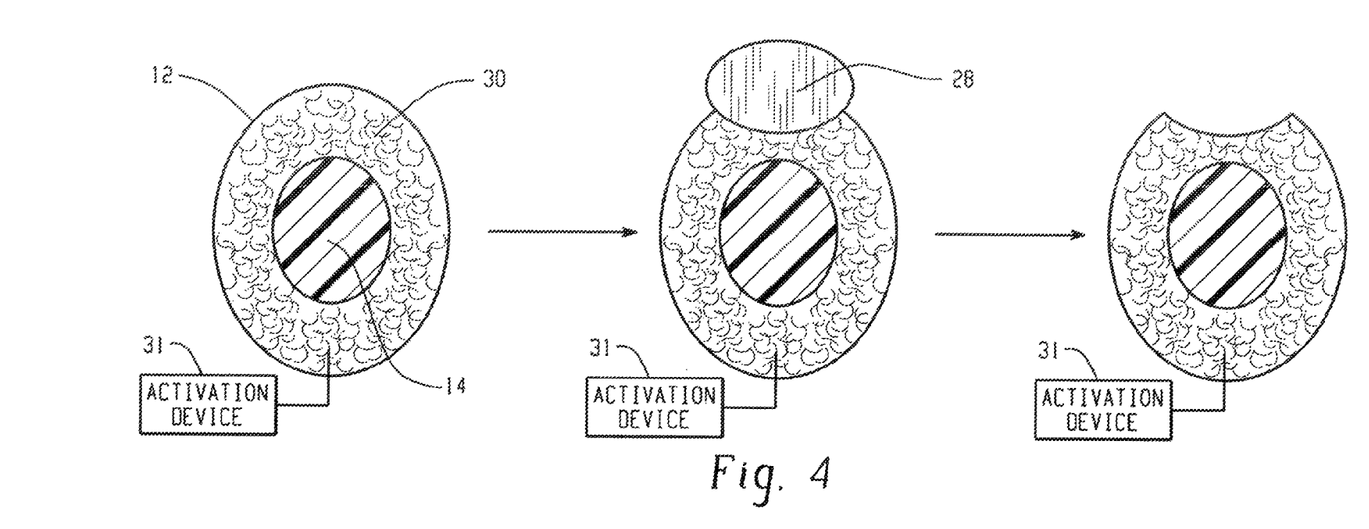
FIG. 4 is a cross sectional view of the conformal grasp handle taken along lines 2-2 of FIG. 1 and in accordance with another embodiment.
Figure 5:
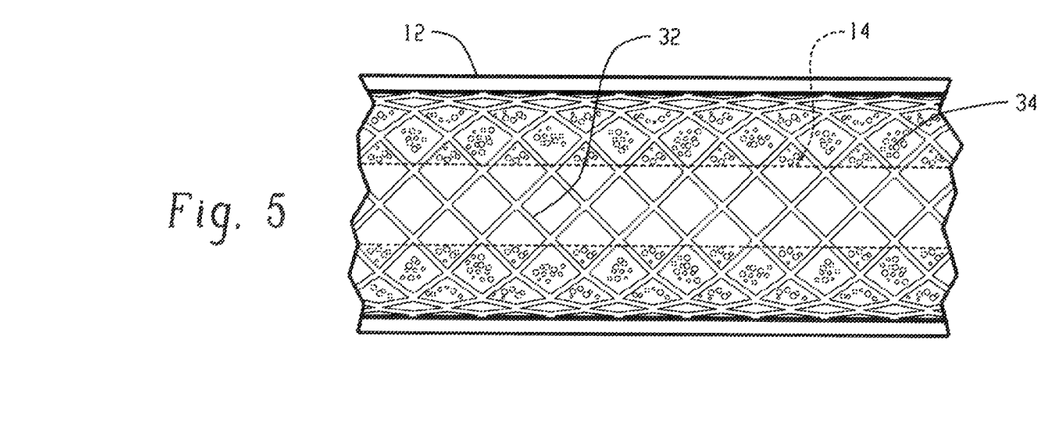
FIG. 5 is a cross sectional view of the conformal grasp handle taken along lines 3-3 of FIG. 1 and in accordance with another embodiment.

In another embodiment, a conformal grasp handle comprises a shape memory material 30 disposed within the sealed area as shown in FIG. 4. For example, a shape memory polymer may be disposed within the sealed area 18. Alternatively, the shape memory material may be formed into an annular mesh sleeve 32 as shown in FIG. 5, similar in design to a medical stent. A compressible foam (not shown) is disposed intermediate the sleeve 32 and the annular rigid member 14. As an example of use, an end user can deform the surface of the steering wheel by gripping and applying a load (pressure) to the conformal grasp handle 10 to cause local deformations corresponding to the regions of applied load, i.e., pressure. An activation signal can then be applied to the shape memory material to revert the conformal grasp handle back to its original shape, i.e., without local deformations. An activation device 31 can be in operative communication with the shape memory material 30 in order to supply the activation signal, thereby changing a shape of the material. For example, the shape memory alloy or polymer may be exposed to a thermal activation signal by means of a resistive heating element coupled to the shape memory material, or by the operating temperatures to which the steering wheel is exposed, or the like. For example, with regard to resistive heating, an annular heating element may be disposed in and/or about the annular rigid member or may be coupled directly to the shape memory material.

Figure 6:
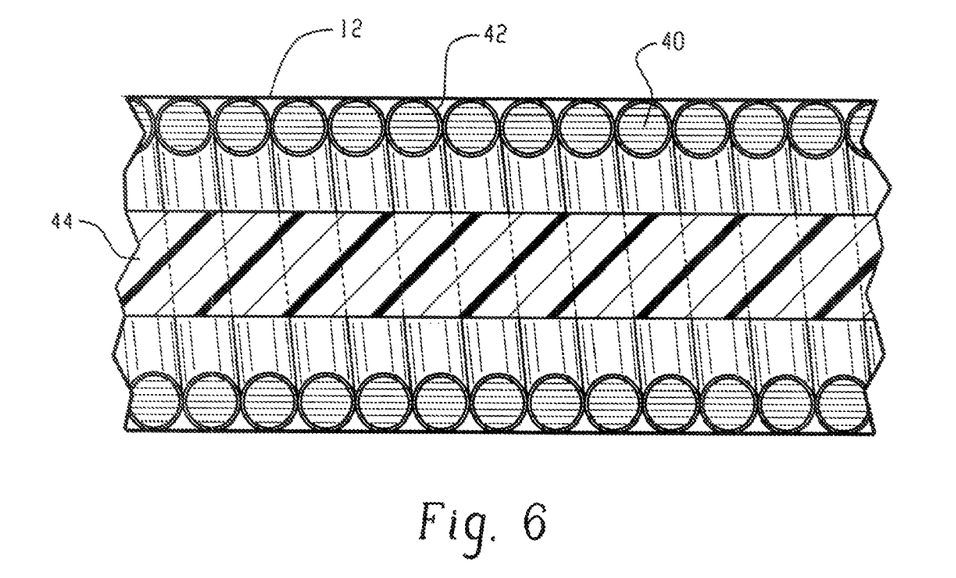
FIG. 6 is a cross sectional view of the conformal grasp handle taken along lines 3-3 of FIG. 1 and in accordance with yet another embodiment.

FIG. 6 illustrates a conformal grasp handle employing magnetorheological or electrorheological fluids as the shape memory material. The shape memory is maintained by a magnetic field or an electric field, depending on the material properties. Removal of the electric or magnetic field restores the surfaces to its original shape. The magnetorheological or electrorheological fluid 40 is encapsulated with a membrane and is formed in the shape of rings 42. The rings 42 are stacked about a core 44 comprising an electromagnet (as in the case of a magnetorheological fluid) or an electric field generating device (as in the case of an electrorheological fluid). Optionally, a magnetic and/or electric field transparent material is disposed intermediate the core and the rings.

Figure 7:
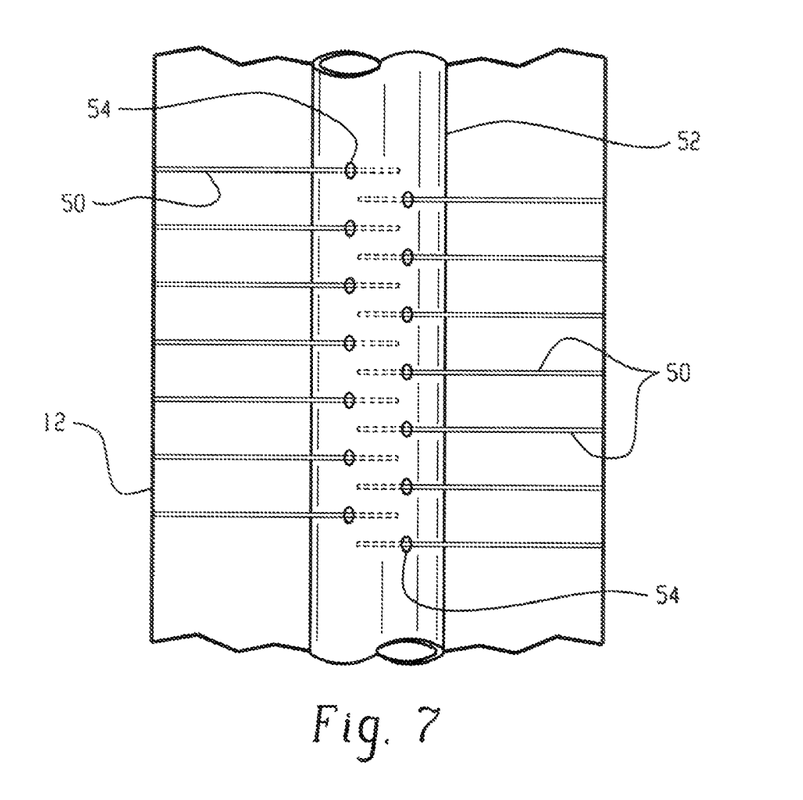
FIG. 7 is a cross sectional view of the conformal grasp handle taken along lines 3-3 of FIG. 1 and in accordance with yet another embodiment.

FIG. 7 illustrates another embodiment of the conformal grasp handle. In this embodiment, a plurality of pins 50 is affixed to the flexible covering 12 about an electromagnetic tube 52. The pins are formed of a magnetic material, e.g., steel. Each end of the pin is in sliding engagement with an aperture 54 disposed in the tube 52. In one embodiment, the plurality of magnetic pins 50 is in a staggered relationship about the electromagnetic tube 52. During operation, depression of the surface defining the flexible covering causes local deformation to occur. Actuation of the electromagnet immobilizes the pins such that the deformation pattern is maintained once the surface load is removed.

Figure 8:
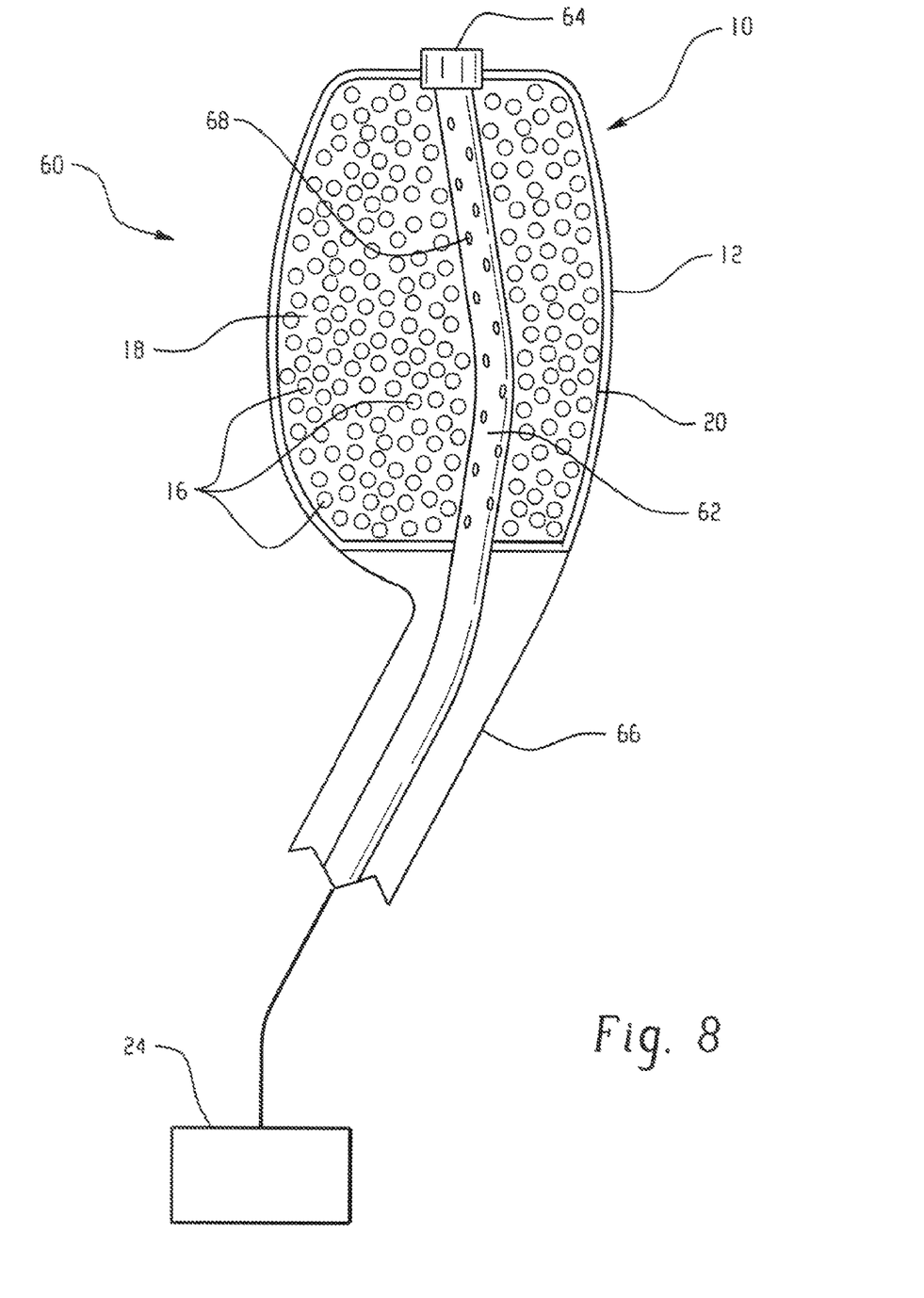
FIG. 8 is a cross sectional view of a shift knob including a conformal grasp handle.

FIG. 8 illustrates a shift knob 60 including the conformal grasp handle 10. The shift knob 60 generally includes a rigid core member 62 and the flexible outer covering 12. The flexible covering 12 defines the sealed area 18 in which the plurality of beads 16 (as shown) or shape memory material is disposed therein. One end of the core member 62 is coupled to or integrated with a shifter link 66 that is in operative communication with a transmission for engaging a drive mechanism for a vehicle. The other end may include an actuator 64 for operating the conformal grasp handle 10 in the manner previously described. For example, the actuator may actuate a vacuum 24 in fluid communication with the rigid core member 62. In this embodiment, the rigid core member 62 includes one or more perforations 68 to provide fluid communication between the sealed area 18 and the vacuum 24. In this manner, the vacuum 24 can selectively remove fluid from the sealed area 18 so as to provide shape memory of any local deformations. Alternatively, depending on the material and configuration of the shift knob 60, the rigid core member 62 may include a resistive heating element, a magnetic field generator, an electric field generator, and like components for providing shape memory to the particular material employed in the conformal grasp handle in the manner previously described with respect to the steering wheel.

Shape memory alloys can exist in several different temperature-dependent phases. The most commonly utilized of these phases are the so-called martensite and austenite phases. In the following discussion, the martensite phase generally refers to the more deformable, lower temperature phase whereas the austenite phase generally refers to the more rigid, higher temperature phase. When the shape memory alloy is in the martensite phase and is heated, it begins to change into the austenite phase. The temperature at which this phenomenon starts is often referred to as austenite start temperature ($A_s$). The temperature at which this phenomenon is complete is called the austenite finish temperature ($A_f$). When the shape memory alloy is in the austenite phase and is cooled, it begins to change into the martensite phase, and the temperature at which this phenomenon starts is referred to as the martensite start temperature ($M_s$). The temperature at which shape memory alloy finishes transforming to the martensite phase is called the martensite finish temperature ($M_f$). Generally, shape memory alloys have a lower modulus and are more easily deformable in their martensitic phase and have a higher modulus and are thus less easily deformable in the austenitic phase.

Suitable shape memory alloys can exhibit a one-way shape memory effect, an intrinsic two-way effect, or an extrinsic two-way shape memory effect depending on the alloy composition and processing history. In other embodiments, a counterbalancing spring is employed in combination with the shape memory alloy to provide a restoring force. In this manner, the actuator can be made reversible. The return spring preferably has a modulus somewhere between the martensite and austenite phase transformation temperatures of the shape memory alloy. Alternatively, separately actuatable parallel SMA elements can be alternately activated, each reversing the action of the other.

Shape memory materials formed from shape memory alloy compositions that exhibit one-way shape memory effects do not automatically reform, and depending on the shape memory material design, will likely require an external mechanical force to reform the shape, dimension, that was previously exhibited. Shape memory materials that exhibit an intrinsic shape memory effect are fabricated from a shape memory alloy composition that will automatically reform itself as a result of the above noted phase transformations.

Intrinsic two-way shape memory behavior is preferably induced in the shape memory material through processing. Such procedures include extreme deformation of the material while in the martensite phase, heating-cooling under constraint or load, or surface modification such as laser annealing, polishing, or shot-peening. Once the material has been trained to exhibit the two-way shape memory effect, the shape change between the low and high temperature states is generally reversible and persists through a high number of thermal cycles.

Shape memory materials that exhibit the extrinsic two-way shape memory effects are composite or multi-component materials that combine a shape memory alloy composition that exhibits a one-way effect with another element that provides a restoring force to reform the original shape.

The temperature at which the shape memory alloy remembers its high temperature form when heated can be adjusted by slight changes in the composition of the alloy and through heat treatment. In nickel-titanium shape memory alloys, for example, it can be changed from above about 100° C. to below about −100° C. The shape recovery process occurs over a range of just a few degrees and the start or finish of the transformation can be controlled to within a degree or two depending on the desired application and alloy composition. The mechanical properties of the shape memory alloy vary greatly over the temperature range spanning their transformation, typically providing the alloy with shape memory effects.

Suitable shape memory alloy materials include without limitation nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-platinum based alloys, iron-palladium based alloys, and the like. The alloys can be binary, ternary, or any higher order so long as the alloy composition exhibits a shape memory effect, e.g., change in shape, dimension, damping capacity, and the like. For example, a nickel-titanium based alloy is commercially available under the trademark NITINOL from Shape Memory Applications, Inc.

Other suitable active materials are shape memory polymers. Similar to the behavior of a shape memory alloy, when the temperature is raised through its transition temperature, the shape memory polymer also undergoes a change in shape and/or dimension. To set the permanent shape of the shape memory polymer, the polymer must be at about or above the Tg or melting point of the hard segment of the polymer. "Segment" refers to a block or sequence of polymer forming part of the shape memory polymer. The shape memory polymers are shaped at the temperature with an applied force followed by cooling to set the permanent shape. The temperature necessary to set the permanent shape is preferably between about 100° C. to about 300° C. Setting the temporary shape of the shape memory polymer requires the shape memory polymer material to be brought to a temperature at or above the Tg or transition temperature of the soft segment, but below the Tg or melting point of the hard segment. At the soft segment transition temperature (also termed "first transition temperature"), the temporary shape of the shape memory polymer is set followed by cooling of the shape memory polymer to lock in the temporary shape. The temporary shape is maintained as long as it remains below the soft segment transition temperature. The permanent shape is regained when the shape memory polymer fibers are once again brought to or above the transition temperature of the soft segment. Repeating the heating, shaping, and cooling steps can reset the temporary shape. The soft segment transition temperature can be chosen for a particular application by modifying the structure and composition of the polymer. Transition temperatures of the soft segment range from about −63° C. to above about 120° C.

Shape memory polymers may contain more than two transition temperatures. A shape memory polymer composition comprising a hard segment and two soft segments can have three transition temperatures: the highest transition temperature for the hard segment and a transition temperature for each soft segment.

Most shape memory polymers exhibit a "one-way" effect, wherein the shape memory polymer exhibits one permanent shape. Upon heating the shape memory polymer above the first transition temperature, the permanent shape is achieved and the shape will not revert back to the temporary shape without the use of outside forces. As an alternative, some shape memory polymer compositions can be prepared to exhibit a "two-way" effect. These systems consist of at least two polymer components. For example, one component could be a first cross-linked polymer while the other component is a different cross-linked polymer. The components are combined by layer techniques, or are interpenetrating networks, wherein two components are cross-linked but not to each other. By changing the temperature, the shape memory polymer changes its shape in the direction of the first permanent shape to the second permanent shape. Each of the permanent shapes belongs to one component of the shape memory polymer. The two permanent shapes are always in equilibrium between both shapes. The temperature dependence of the shape is caused by the fact that the mechanical properties of one component ("component A") are almost independent from the temperature in the temperature interval of interest. The mechanical properties of the other component ("component B") depend on the temperature. In one embodiment, component B becomes stronger at low temperatures compared to component A, while component A is stronger at high temperatures and determines the actual shape. A two-way memory device can be prepared by setting the permanent shape of component A ("first permanent shape"); deforming the device into the permanent shape of component B ("second permanent shape") and fixing the permanent shape of component B while applying a stress to the component.

Similar to the shape memory alloy materials, the shape memory polymers can be configured in many different forms and shapes. The temperature needed for permanent shape recovery can be set at any temperature between about −63° C. and about 120° C. or above. Engineering the composition and structure of the polymer itself can allow for the choice of a particular temperature for a desired application. A preferred temperature for shape recovery is greater than or equal to about −30° C., more preferably greater than or equal to about 0° C., and most preferably a temperature greater than or equal to about 50° C. Also, a preferred temperature for shape recovery is less than or equal to about 120° C., more preferably less than or equal to about 90° C., and most preferably less than or equal to about 70° C.

Suitable shape memory polymers include thermoplastics, thermosets, interpenetrating networks, semi-interpenetrating networks, or mixed networks. The polymers can be a single polymer or a blend of polymers. The polymers can be linear or branched thermoplastic elastomers with side chains or dendritic structural elements. Suitable polymer components to form a shape memory polymer include, but are not limited to, polyphosphazenes, poly(vinyl alcohols), polyamides, polyester amides, poly(amino acid)s, polyanhydrides, polycarbonates, polyacrylates, polyalkylenes, polyacrylamides, polyalkylene glycols, polyalkylene oxides, polyalkylene terephthalates, polyortho esters, polyvinyl ethers, polyvinyl esters, polyvinyl halides, polyesters, polylactides, polyglycolides, polysiloxanes, polyurethanes, polyethers, polyether amides, polyether esters, and copolymers thereof. Examples of suitable polyacrylates include poly(methyl methacrylate), poly(ethyl methacrylate), ply(butyl methacrylate), poly (isobutyl methacrylate), poly(hexyl methacrylate), poly(isodecyl methacrylate), poly(lauryl methacrylate), poly(phenyl methacrylate), poly(methyl acrylate), poly(isopropyl acrylate), poly(isobutyl acrylate) and poly(octadecyl acrylate).

Examples of other suitable polymers include polystyrene, polypropylene, polyvinyl phenol, polyvinylpyrrolidone, chlorinated polybutylene, poly(octadecyl vinyl ether) ethylene vinyl acetate, polyethylene, poly(ethylene oxide)-poly (ethylene terephthalate), polyethylene/nylon (graft copolymer), polycaprolactones-polyamide (block copolymer), poly (caprolactone) dimethacrylate-n-butyl acrylate, poly (norbornyl-polyhedral oligomeric silsequioxane), polyvinylchloride, urethane/butadiene copolymers, polyurethane block copolymers, styrene-butadiene-styrene block copolymers, and the like.

The shape memory polymer or the shape memory alloy, may be activated by any suitable means, preferably a means for subjecting the material to a temperature change above, or below, a transition temperature. For example, for elevated temperatures, heat may be supplied using hot gas (e.g., air), steam, hot liquid, or electrical current. The activation means may, for example, be in the form of heat conduction from a heated element in contact with the shape memory material, heat convection from a heated conduit in proximity to the thermally active shape memory material, a hot air blower or jet, microwave interaction, resistive heating, and the like. In the case of a temperature drop, heat may be extracted by using cold gas, or evaporation of a refrigerant. The activation means may, for example, be in the form of a fan, a cooling probe having a cooled tip, a control signal to a thermoelectric unit, a cold air blower or jet, or means for introducing a refrigerant (such as liquid nitrogen) to at least the vicinity of the shape memory material.

Suitable magnetic materials include, but are not intended to be limited to, soft or hard magnets; hematite; magnetite; magnetic material based on iron, nickel, and cobalt, alloys of the foregoing, or combinations comprising at least one of the foregoing, and the like. Alloys of iron, nickel and/or cobalt, can comprise aluminum, silicon, cobalt, nickel, vanadium, molybdenum, chromium, tungsten, manganese and/or copper.

Suitable MR fluid materials include, but are not intended to be limited to, ferromagnetic or paramagnetic particles dispersed in a carrier fluid. Suitable particles include iron; iron alloys, such as those including aluminum, silicon, cobalt, nickel, vanadium, molybdenum, chromium, tungsten, manganese and/or copper; iron oxides, including $Fe_2O_3$ and $Fe_3O_4$; iron nitride; iron carbide; carbonyl iron; nickel and alloys of nickel; cobalt and alloys of cobalt; chromium dioxide; stainless steel; silicon steel; and the like. Examples of suitable particles include straight iron powders, reduced iron powders, iron oxide powder/straight iron powder mixtures and iron oxide powder/reduced iron powder mixtures. A preferred magnetic-responsive particulate is carbonyl iron, preferably, reduced carbonyl iron. Optionally, the MR fluid is disposed within an open or closed celled flexible foam.

The particle size should be selected so that the particles exhibit multi-domain characteristics when subjected to a magnetic field. Diameter sizes for the particles can be less than or equal to about 1000 micrometers, with less than or equal to about 500 micrometers preferred, and less than or equal to about 100 micrometers more preferred. Also preferred is a particle diameter of greater than or equal to about 0.1 micrometer, with greater than or equal to about 0.5 more preferred, and greater than or equal to about 10 micrometers especially preferred. The particles are preferably present in an amount between about 5.0 to about 50 percent by volume of the total MR fluid composition.

Suitable carrier fluids include organic liquids, especially non-polar organic liquids. Examples include, but are not limited to, silicone oils; mineral oils; paraffin oils; silicone copolymers; white oils; hydraulic oils; transformer oils; halogenated organic liquids, such as chlorinated hydrocarbons, halogenated paraffins, perfluorinated polyethers and fluorinated hydrocarbons; diesters; polyoxyalkylenes; fluorinated silicones; cyanoalkyl siloxanes; glycols; synthetic hydrocarbon oils, including both unsaturated and saturated; and combinations comprising at least one of the foregoing fluids.

The viscosity of the carrier component can be less than or equal to about 100,000 centipoise, with less than or equal to about 10,000 centipoise preferred, and less than or equal to about 1,000 centipoise more preferred. Also preferred is a viscosity of greater than or equal to about 1 centipoise, with greater than or equal to about 250 centipoise preferred, and greater than or equal to about 500 centipoise especially preferred.

Aqueous carrier fluids may also be used, especially those comprising hydrophilic mineral clays such as bentonite or hectorite. The aqueous carrier fluid may comprise water or water comprising a small amount of polar, water-miscible organic solvents such as methanol, ethanol, propanol, dimethyl sulfoxide, dimethyl formamide, ethylene carbonate, propylene carbonate, acetone, tetrahydrofuran, diethyl ether, ethylene glycol, propylene glycol, and the like. The amount of polar organic solvents is less than or equal to about 5.0% by volume of the total MR fluid, and preferably less than or equal to about 3.0%. Also, the amount of polar organic solvents is preferably greater than or equal to about 0.1%, and more preferably greater than or equal to about 1.0% by volume of the total MR fluid. The pH of the aqueous carrier fluid is preferably less than or equal to about 13, and preferably less than or equal to about 9.0. Also, the pH of the aqueous carrier fluid is greater than or equal to about 5.0, and preferably greater than or equal to about 8.0.

Natural or synthetic bentonite or hectorite may be used. The amount of bentonite or hectorite in the MR fluid is less than or equal to about 10 percent by weight of the total MR fluid, preferably less than or equal to about 8.0 percent by weight, and more preferably less than or equal to about 6.0 percent by weight. Preferably, the bentonite or hectorite is present in greater than or equal to about 0.1 percent by weight, more preferably greater than or equal to about 1.0 percent by weight, and especially preferred greater than or equal to about 2.0 percent by weight of the total MR fluid.

Optional components in the MR fluid include clays, organoclays, carboxylate soaps, dispersants, corrosion inhibitors, lubricants, extreme pressure anti-wear additives, antioxidants, thixotropic agents and conventional suspension agents. Carboxylate soaps include ferrous oleate, ferrous naphthenate, ferrous stearate, aluminum di- and tri-stearate, lithium stearate, calcium stearate, zinc stearate and sodium stearate, and surfactants such as sulfonates, phosphate esters, stearic acid, glycerol monooleate, sorbitan sesquioleate, laurates, fatty acids, fatty alcohols, fluoroaliphatic polymeric esters, and titanate, aluminate and zirconate coupling agents and the like. Polyalkylene diols, such as polyethylene glycol, and partially esterified polyols can also be included.

Suitable MR elastomer materials include, but are not intended to be limited to, an elastic polymer matrix comprising a suspension of ferromagnetic or paramagnetic particles, wherein the particles are described above. Suitable polymer matrices include, but are not limited to, poly-alpha-olefins, natural rubber, silicone, polybutadiene, polyethylene, polyisoprene, and the like.

Electroactive polymers include those polymeric materials that exhibit piezoelectric, pyroelectric, or electrostrictive properties in response to electrical or mechanical fields. The materials generally employ the use of compliant electrodes that enable polymer films to expand or contract in the in-plane directions in response to applied electric fields or mechanical stresses. An example of an electrostrictive-grafted elastomer with a piezoelectric poly(vinylidene fluoride-trifluoro-ethylene) copolymer. This combination has the ability to produce a varied amount of ferroelectric-electrostrictive molecular composite systems. These may be operated as a piezoelectric sensor or even an electrostrictive actuator.

Materials suitable for use as an electroactive polymer may include any substantially insulating polymer or rubber (or combination thereof) that deforms in response to an electrostatic force or whose deformation results in a change in electric field. Exemplary materials suitable for use as a pre-strained polymer include silicone elastomers, acrylic elastomers, polyurethanes, thermoplastic elastomers, copolymers comprising PVDF, pressure-sensitive adhesives, fluoroelastomers, polymers comprising silicone and acrylic moieties, and the like. Polymers comprising silicone and acrylic moieties may include copolymers comprising silicone and acrylic moieties, polymer blends comprising a silicone elastomer and an acrylic elastomer, for example.

Materials used as an electroactive polymer may be selected based on one or more material properties such as a high electrical breakdown strength, a low modulus of elasticity (for large or small deformations), a high dielectric constant, and the like. In one embodiment, the polymer is selected such that is has an elastic modulus at most about 100 MPa. In another embodiment, the polymer is selected such that is has a maximum actuation pressure between about 0.05 MPa and about 10 MPa, and preferably between about 0.3 MPa and about 3 MPa. In another embodiment, the polymer is selected such that is has a dielectric constant between about 2 and about 20, and preferably between about 2.5 and about 12. The present disclosure is not intended to be limited to these ranges. Ideally, materials with a higher dielectric constant than the ranges given above would be desirable if the materials had both a high dielectric constant and a high dielectric strength. In many cases, electroactive polymers may be fabricated and implemented as thin films. Thicknesses suitable for these thin films may be below 50 micrometers.

As electroactive polymers may deflect at high strains, electrodes attached to the polymers should also deflect without compromising mechanical or electrical performance. Generally, electrodes suitable for use may be of any shape and material provided that they are able to supply a suitable voltage to, or receive a suitable voltage from, an electroactive polymer. The voltage may be either constant or varying over time. In one embodiment, the electrodes adhere to a surface of the polymer. Electrodes adhering to the polymer are preferably compliant and conform to the changing shape of the polymer. Correspondingly, the present disclosure may include compliant electrodes that conform to the shape of an electroactive polymer to which they are attached. The electrodes may be only applied to a portion of an electroactive polymer and define an active area according to their geometry. Various types of electrodes suitable for use with the present disclosure include structured electrodes comprising metal traces and charge distribution layers, textured electrodes comprising varying out of plane dimensions, conductive greases such as carbon greases or silver greases, colloidal suspensions, high aspect ratio conductive materials such as carbon fibrils and carbon nanotubes, and mixtures of ionically conductive materials.

Materials used for electrodes of the present disclosure may vary. Suitable materials used in an electrode may include graphite, carbon black, colloidal suspensions, thin metals including silver and gold, silver filled and carbon filled gels and polymers, and ionically or electronically conductive polymers. It is understood that certain electrode materials may work well with particular polymers and may not work as well for others. By way of example, carbon fibrils work well with acrylic elastomer polymers while not as well with silicone polymers.

Advantageously, the conformal grasp handle provides the end user, such as a driver, with a reversible and rapid means of customizing certain interior features of the vehicle that are gripped during operation thereof, e.g., the steering wheel, shift knob, and the like.

While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. A conformal grasp handle alternatively achieving first and second permanent and memorized geometric shapes, comprising:
    a flexible covering;
    a rigid core member;
    an active material intermediate the core member and the flexible covering, and operable to autonomously undergo a reversible change in shape as a result of being exposed to an activation signal, wherein the material comprises a shape memory polymer, a shape memory alloy, a ferromagnetic shape memory alloy, an electroactive polymer, or a combination comprising at least one of the foregoing active materials; and
    an activation device operable to generate the signal, and in operative communication with the active material, so as to be able to selectively cause the material to be exposed to the signal,
    said material and device being cooperatively configured to cause the handle to reversibly toggle between the shapes, solely as a result of the change,
    wherein the conformal grasp handle forms an outer gripping surface of a selected one or both of a steering wheel and a shift knob.

2. The conformal grasp handle of claim 1, wherein the active material forms a sleeve, and the conformal grasp handle further comprises a compressible material disposed within the sleeve.

3. The conformal grasp handle of claim 1, wherein the core member has a ring shape.

4. The conformal grasp handle of claim 1, wherein the shape memory material is a magnetorheological fluid or an electrorheological fluid encapsulated in a membrane, wherein the membrane is formed in the shape of a ring, the grasp handle comprising a plurality of the rings stacked about the core member, wherein the core member is an electromagnet or an electric field generating device.

* * * * *